(12) United States Patent
Li et al.

(10) Patent No.: US 8,613,526 B1
(45) Date of Patent: Dec. 24, 2013

(54) LED AQUARIUM LIGHTING DEVICE

(75) Inventors: Vincent Tsz Yeung Li, Hong Kong (CN); Wa Hing Leung, Hong Kong (CN)

(73) Assignee: Huizhou Light Engine, Ltd, Huizhou (CN)

( * ) Notice: Subject to any disclaimer, the term of this patent is extended or adjusted under 35 U.S.C. 154(b) by 29 days.

(21) Appl. No.: 13/584,911

(22) Filed: Aug. 14, 2012

(51) Int. Cl.
*F21V 9/00* (2006.01)

(52) U.S. Cl.
USPC .............. 362/230; 362/217.01; 362/249.02

(58) Field of Classification Search
None
See application file for complete search history.

*Primary Examiner* — Donald Raleigh
(74) *Attorney, Agent, or Firm* — Schiff Hardin LLP

(57) ABSTRACT

A lighting fixture comprising a housing, and a light engine mounted to the housing and having an LED array. The LED array comprises deep-blue LEDs having a perceived wavelength within a range of 450 to 465 nm, and a percentage of total luminous flux in a range of 1 to 7%; true-green LEDs having a perceived wavelength within a range of 523 to 527 nm, and a percentage of total luminous flux in a range of 53 to 70%; red-orange LEDs having a perceived wavelength within a range of 610 to 620 nm, and a percentage of total luminous flux in a range of 19 to 32%; and phosphor-based coolwhite LEDs having a percentage of total luminous flux in a range of 5 to 15%, wherein the light engine has a correlated color temperature (CCT) in a range of 4500 to 10000K.

30 Claims, 4 Drawing Sheets

| CCT | Deep-blue LEDs | Red-orange LEDs | True-green LEDs | Coolwhite LEDs of such CCT |
|---|---|---|---|---|
| 4500K | 1~3 | 26~32% | 53~64% | 5~15% |
| 5000K | 1~4% | 25~31% | 54~65% | 5~15% |
| 5500K | 2~4% | 24~30% | 54~66% | 5~15% |
| 6000K | 2~5% | 23~29% | 55~67% | 5~15% |
| 6500K | 2~5% | 22~29% | 55~67% | 5~15% |
| 7000K | 2~5% | 21~28% | 55~68% | 5~15% |
| 7500K | 2~6% | 21~28% | 56~69% | 5~15% |
| 8000K | 2~6% | 20~27% | 56~69% | 5~15% |
| 8500K | 2~6% | 20~27% | 56~69% | 5~15% |
| 9000K | 3~6% | 19~27% | 56~70% | 5~15% |
| 9500K | 3~7% | 19~26% | 56~70% | 5~15% |
| 10000K | 3~7% | 19~26% | 56~70% | 5~15% |

| CCT | Deep-blue LEDs | Red-orange LEDs | True-green LEDs | Coolwhite LEDs of such CCT |
|---|---|---|---|---|
| 4500K | 1~3 | 26~32% | 53~64% | 5~15% |
| 5000K | 1~4% | 25~31% | 54~65% | 5~15% |
| 5500K | 2~4% | 24~30% | 54~66% | 5~15% |
| 6000K | 2~5% | 23~29% | 55~67% | 5~15% |
| 6500K | 2~5% | 22~29% | 55~67% | 5~15% |
| 7000K | 2~5% | 21~28% | 55~68% | 5~15% |
| 7500K | 2~6% | 21~28% | 56~69% | 5~15% |
| 8000K | 2~6% | 20~27% | 56~69% | 5~15% |
| 8500K | 2~6% | 20~27% | 56~69% | 5~15% |
| 9000K | 3~6% | 19~27% | 56~70% | 5~15% |
| 9500K | 3~7% | 19~26% | 56~70% | 5~15% |
| 10000K | 3~7% | 19~26% | 56~70% | 5~15% |

Relative spectral power vs. wavelength of four LEDs of preferred embodiment

Relative spectral power vs. wavelength
LEDs of preferred embodiment versus fluorescent lamp versus conventional white LED

LED AQUARIUM LIGHTING DEVICE

BACKGROUND

The present invention is directed generally to a lighting fixture, and more particularly to a lighting fixture for use with an aquarium.

It is common to install in a home or office an aquarium for keeping aquatic plants and/or fish. The look and design of plants within the aquarium is living art forming part of the room's décor.

An aquarium is generally provided with a lighting fixture that is mounted on or above the aquarium tank.

Conventional light emitting diode (LED) aquarium lighting fixtures consist of only phosphor-based white LEDs, or alternatively of phosphor-based white LEDs plus blue LEDs. Such conventional LED lighting fixtures have a drawback in that the green and red colors in plants look less vivid and rich in comparison with plants illuminated by fluorescent tubes. Instead, plants look more yellowish-green. This negative effect on color is due to differences in the spectrums of conventional LEDs and fluorescent tubes.

Therefore, it is desirable to provide an LED lighting fixture that eliminates the aforesaid drawbacks and provides a better aesthetic.

DETAILED DESCRIPTION

The present invention is directed generally to a lighting fixture that provides more naturally looking green and red colors in aquatic plants. The lighting fixture has an LED array comprising different kinds of LEDs, each with a specified perceived wavelength and total luminous flux.

Figure 1:
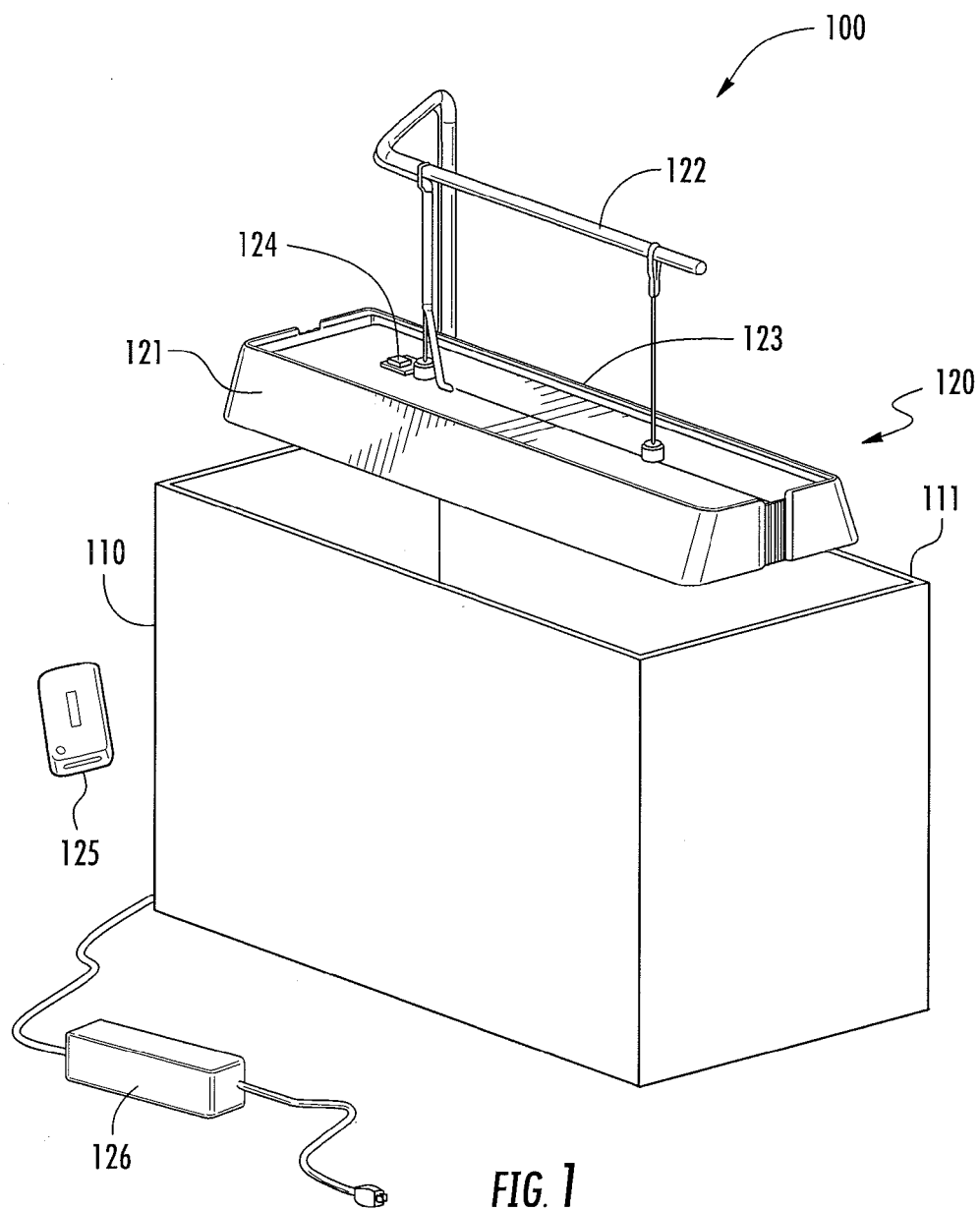
FIG. 1 is a schematic drawing illustrating a lighting fixture mounted above an aquarium tank in accordance with a preferred embodiment.

FIG. 1 is a schematic drawing illustrating an aquarium 100 in accordance with a preferred embodiment.

The aquarium 100 has a tank 110 with an open top defined by a top edge 111. An LED lighting fixture 120 is shown mounted above the tank 110 by means of a mounting assembly 122. Alternatively, the LED lighting fixture 120 may be mounted directly on the tank's top edge 111.

The LED lighting fixture 120 has a housing 121, a power supply 126, and a light engine. The power supply unit 126 is configured to provide the LED lighting fixture 120 with AC or DC power, as is known.

The light engine comprises an LED array (not shown in FIG. 1) and control circuit 123, which is configured to control a brightness of the LED array and maintain the brightness over what one of ordinary skill would consider to be small variations in electrical and thermal conditions during operation. This control may be either automatic (e.g., based on amount of light in the room, or time of day) or based on input from a user. The user may input control commands to the control circuit 123 either via a control button 124, or alternatively via a remote control 125. Of course both types of control are not required; either one, or an alternative means, would suffice. The control button 124 is electrically coupled to the control circuit 124, and in the figure is shown mounted to the housing 121, though alternative designs are possible. The remote control 125 is configured to communicate with the control circuit 123 wirelessly, but wired communication is also possible.

Figure 2:
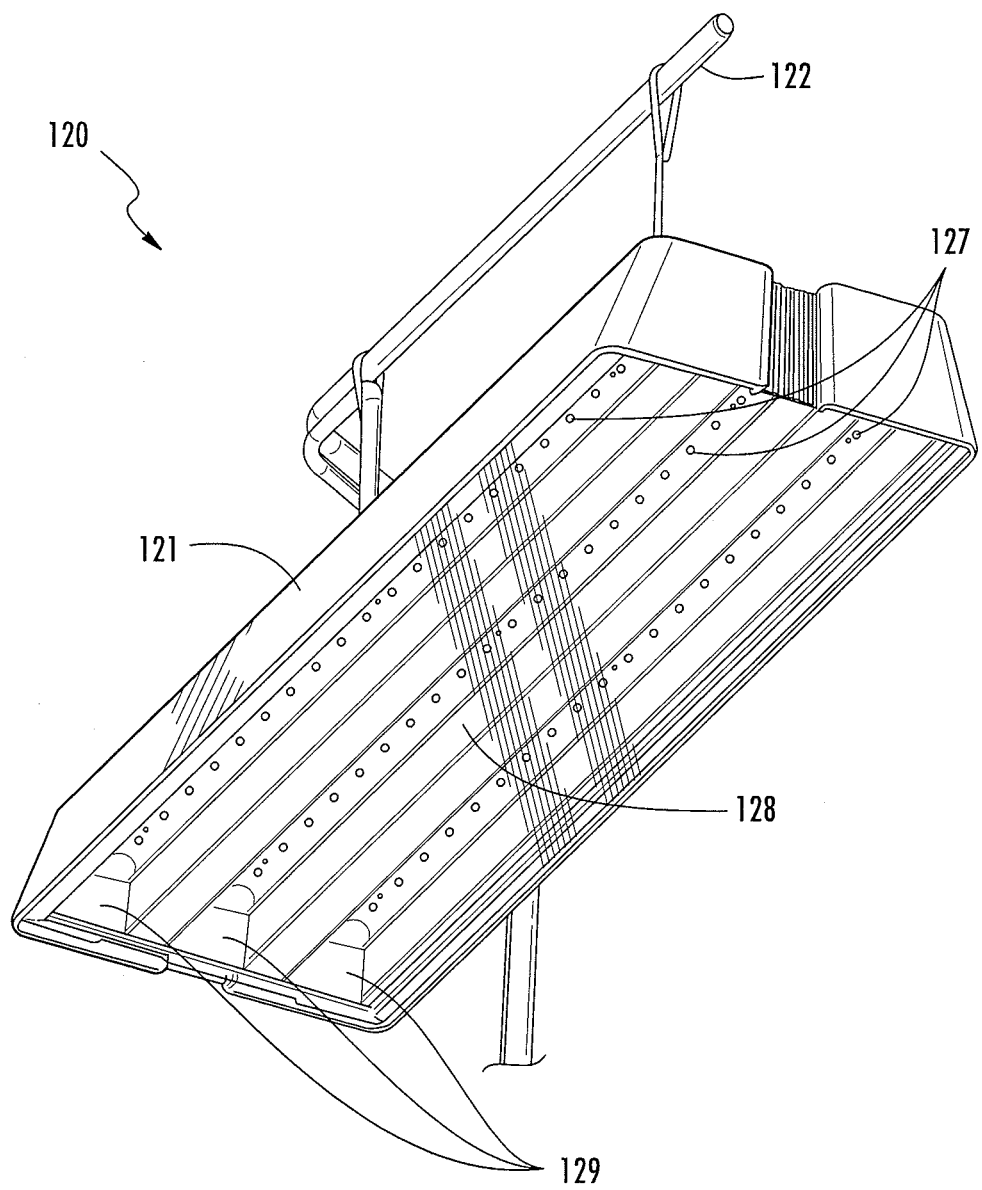
FIG. 2 is schematic drawing of a bottom view of a lighting fixture in accordance with a preferred embodiment.

FIG. 2 is schematic bottom view of details of the LED lighting fixture 120 in accordance with a preferred embodiment.

The LED lighting fixture 120 includes housing 121, a mounting assembly 122, a light engine including an LED array 127, a translucent cover 128, and a reflector 129. The light engine is mounted to the housing 121, and includes the control circuit 123 and associated controls discussed above, along with the LED array 127. The translucent cover 128 is mounted on the housing 121 such that the LED array 127 is located between the housing 121 and the translucent cover 128, and its material is chosen so that light from the LEDs mix well. The reflector 129 is mounted within the housing 121, and is designed to direct as much light from the LED array 127 as possible within the tank.

The size/shape of the lighting fixture 120 shown in FIG. 2 is merely an example. It is appreciated by those of skill in the art that the size and shape are adaptable to the aquarium 100 intended to be illuminated.

As discussed above, the lighting fixture 120 is designed to provide more naturally looking green and red colors in aquatic plants. To accomplish this goal, the LED array 127 consists of four different kinds of LEDs, each having a specific perceived wavelength and total luminous flux.

The four different kinds of LEDs used to achieve a lighting fixture having a correlated color temperature (CCT) in a range of 4500 to 10000K are as follows: (1) deep-blue LEDs; (2) true-green LEDs; (3) red-orange LEDs; and (4) phosphor-based coolwhite LEDs. Each kind of LED has a specified total luminous flux, and each kind of the deep-blue, true-green, and red-orange LEDs also has a specified perceived wavelength.

Although there are four different kinds of LEDs, the specific number of each kind of LED depends on the power of each LED. What is important is the ratio of luminous flux of the kinds of LEDs. The lighting fixture may have a CCT in a range of 4500 to 10000K and LEDs as follows:

Deep-blue LEDs having a perceived wavelength within a range of 450 to 465 nm, and a percentage of total luminous flux in a range of 1 to 7%. The peak wavelength is within a range of 440 to 450 nm.

True-green LEDs having a perceived wavelength within a range of 523 to 527 nm, and a percentage of total luminous flux in a range of 53 to 70%. The peak wavelength is within a range of 515 to 525 nm.

Red-orange LEDs having a perceived wavelength within a range of 610 to 620 nm, and a percentage of total luminous flux in a range of 19 to 32%. The peak wavelength is within a range of 620 to 630 nm.

Phosphor-based coolwhite LEDs having a CCT in a range of 4500 to 10000K, and a percentage of total luminous flux in a range of 5 to 15%. More preferably, these LEDs have a CCT of 6500K.

The lighting fixture provides a better aquarium appearance when having a CCT in a range of 4500 to 10000K, but an even better experience at 6500K. By using a different percentage combination of the total luminous flux, the four different kinds of LEDs can be combined to result in a particular CCT.

Figures 3, 4:
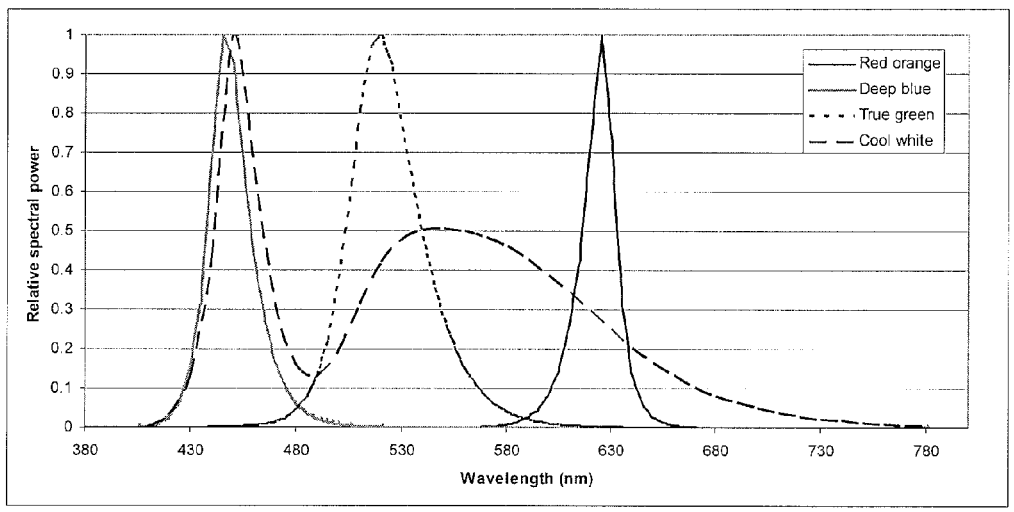
FIG. 3 is a chart of percentage combinations of the total luminous flux for different CCTs.
FIG. 4 is a graph illustrating relative spectral power versus wavelength for each of four kinds of LEDs.

For example, the chart shown in FIG. 3 provides exemplary embodiments of percentage combinations of the total luminous flux for different CCTs.

FIG. 4 is a graph illustrating for each of these four kinds of LEDs, relative spectral power versus wavelength. As is known, spectral power is the power per unit area per unit wavelength of an illumination.

Figure 5:
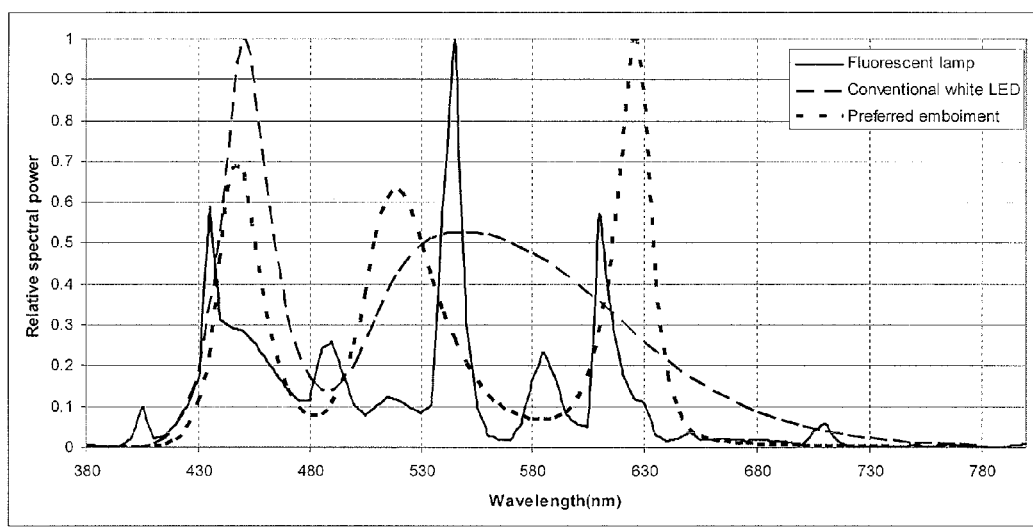
FIG. 5 is a graph illustrating the relative spectral power versus wavelength of the LEDs versus a conventional fluorescent lamp, and versus a conventional white LED.

FIG. 5 is a graph illustrating the relative spectral power versus wavelength of the LEDs of a preferred embodiment, versus a conventional fluorescent lamp, and versus a conventional white LED.

The wavelength of each of the four different kinds of LEDs is chosen carefully for the following reasons.

Deep-Blue LEDs:

In order to increase the purity of green appearance of aquatic plants, green light is added to the LED array 127. This is accomplished by adding deep-blue LEDs, having a perceived wavelength in a range of 450 to 465 nm, to balance out the large portion of green light. The resulting light will be white light, back on the black body locus.

True-Green LED and Phosphor-Based Coolwhite LEDs:

Conventional white LEDs make aquatic plants looks yellowish, because they contain a large portion of yellow-green to yellow light in a spectral range of 555 to 590 nm. Alternatively, aquatic plants under fluorescent light have a green color with high purity due to its narrow spectral spike at approximately 555 nm. However, for the same reason, such a fluorescent light does not reflect variations of green among different species of green aquatic plants.

The LED array 127 therefore has a combination of true-green LEDs, having a perceived wavelength in a range of 523 to 527 nm, and phosphor-based coolwhite LEDs having a CCT in a range of 4500 to 10000K, but preferably 6500K. This combination shows a wider variety of green colors on the aquatic plants, without the plants looking yellowish. The true-green LEDs are chosen because they provide the plants with a rich green appearance. However, true-green LEDs alone will make the plant look unnatural due to a lack of yellow-green to yellow light. Hence, a carefully chosen amount of the phosphor-based coolwhite light mentioned above is added to provide yellow-green to yellow light.

Red-Orange LED:

For red in aquatic plants, the LED array 127 is advantageous over conventional white LED and fluorescent tubes. The LED array 127 has a peak in a spectral range of 600 to 640 nm, which provides a more distinct red color. The red-orange LEDs, having a perceived wavelength in a range of 610 to 620 nm, are chosen because they show a more natural color in the plants. Red having a perceived wavelength of 625 nm, or super red having a perceived wavelength of 633 nm, will result in a bloody red color, thereby making the plants look unnatural. Hence, these kinds of red are not chosen. Similar to the green appearance, the carefully chosen amount of phosphor-based coolwhite light also helps making the red appearance look more natural.

The LED lighting fixture 120 described herein is applicable to aquariums having either saltwater or freshwater.

As discussed throughout, the LED lighting fixture 120 is beneficial over conventional lighting fixtures for numerous reasons. First, the LED lighting fixture 120 provides better appearance of colors. It provides a more vivid and rich green color appearance to aquatic plants in comparison with the conventional white LED approach. Green in plants will not look as yellowish, but will instead look more natural, and will show more variety. Red will also look more natural over the conventional white LED and fluorescent tube.

Further, the size and shape of the LED fixture 120 is more compact than conventional fluorescent aquarium lighting fixtures. It is adaptable to standard aquarium sizes and shapes. Also, its directional light will also provide higher luminance.

Although specific embodiments have been illustrated and described herein, it will be appreciated by those of ordinary skill in the art that a variety of alternate and/or equivalent implementations may be substituted for the specific embodiments shown and described without departing from the scope of the present application. This application is intended to cover any adaptations or variations of the specific embodiments discussed herein.

What is claimed is:

1. A lighting fixture, comprising:
   a housing; and
   a light engine, which is mounted to the housing, and has an LED array comprising:
   deep-blue LEDs having a perceived wavelength within a range of 450 to 465 nm, and a percentage of total luminous flux in a range of 1 to 7%;
   true-green LEDs having a perceived wavelength within a range of 523 to 527 nm, and a percentage of total luminous flux in a range of 53 to 70%;
   red-orange LEDs having a perceived wavelength within a range of 610 to 620 nm, and a percentage of total luminous flux in a range of 19 to 32%; and
   phosphor-based coolwhite LEDs having a percentage of total luminous flux in a range of 5 to 15%,
   wherein the light engine has a correlated color temperature (CCT) in a range of 4500 to 10000K.

2. The lighting fixture of claim 1, wherein:
   the deep-blue LEDs have a percentage of total luminous flux in a range of 1 to 3%,
   the true-green LEDs have a percentage of total luminous flux in a range of 53 to 64%,
   the red-orange LEDs have a percentage of total luminous flux in a range of 26 to 32%, and
   the light engine has a CCT of 4500K.

3. The lighting fixture of claim 1, wherein:
   the deep-blue LEDs have a percentage of total luminous flux in a range of 1 to 4%,
   the true-green LEDs have a percentage of total luminous flux in a range of 54 to 65%,
   the red-orange LEDs have a percentage of total luminous flux in a range of 25 to 31%, and
   the light engine has a CCT of 5000K.

4. The lighting fixture of claim 1, wherein:
   the deep-blue LEDs have a percentage of total luminous flux in a range of 2 to 4%,
   the true-green LEDs have a percentage of total luminous flux in a range of 54 to 66%,
   the red-orange LEDs have a percentage of total luminous flux in a range of 24 to 30%, and
   the light engine has a CCT of 5500K.

5. The lighting fixture of claim 1, wherein:
   the deep-blue LEDs have a percentage of total luminous flux in a range of 2 to 5%,
   the true-green LEDs have a percentage of total luminous flux in a range of 55 to 67%,
   the red-orange LEDs have a percentage of total luminous flux in a range of 23 to 29%, and
   the light engine has a CCT of 6000K.

6. The lighting fixture of claim 1, wherein:
   the deep-blue LEDs have a percentage of total luminous flux in a range of 2 to 5%,
   the true-green LEDs have a percentage of total luminous flux in a range of 55 to 67%, the red-orange LEDs have a percentage of total luminous flux in a range of 22 to 29%, and
the light engine has a CCT of 6500K.

7. The lighting fixture of claim 1, wherein:
the deep-blue LEDs have a percentage of total luminous flux in a range of 2 to 5%,
the true-green LEDs have a percentage of total luminous flux in a range of 55 to 68%,
the red-orange LEDs have a percentage of total luminous flux in a range of 21 to 28%, and
the light engine has a CCT of 7000K.

8. The lighting fixture of claim 1, wherein:
the deep-blue LEDs have a percentage of total luminous flux in a range of 2 to 6%,
the true-green LEDs have a percentage of total luminous flux in a range of 56 to 69%,
the red-orange LEDs have a percentage of total luminous flux in a range of 21 to 28%, and
the light engine has a CCT of 7500K.

9. The lighting fixture of claim 1, wherein:
the deep-blue LEDs have a percentage of total luminous flux in a range of 2 to 6%,
the true-green LEDs have a percentage of total luminous flux in a range of 56 to 69%,
the red-orange LEDs have a percentage of total luminous flux in a range of 20 to 27%, and
the light engine has a CCT of 8000K.

10. The lighting fixture of claim 1, wherein:
the deep-blue LEDs have a percentage of total luminous flux in a range of 2 to 6%,
the true-green LEDs have a percentage of total luminous flux in a range of 56 to 69%,
the red-orange LEDs have a percentage of total luminous flux in a range of 20 to 27%, and
the light engine has a CCT of 8500K.

11. The lighting fixture of claim 1, wherein:
the deep-blue LEDs have a percentage of total luminous flux in a range of 3 to 6%,
the true-green LEDs have a percentage of total luminous flux in a range of 56 to 70%,
the red-orange LEDs have a percentage of total luminous flux in a range of 19 to 27%, and
the light engine has a CCT of 9000K.

12. The lighting fixture of claim 1, wherein:
the deep-blue LEDs have a percentage of total luminous flux in a range of 3 to 7%,
the true-green LEDs have a percentage of total luminous flux in a range of 56 to 70%,
the red-orange LEDs have a percentage of total luminous flux in a range of 19 to 26%, and
the light engine has a CCT of 9500K.

13. The lighting fixture of claim 1, wherein:
the deep-blue LEDs have a percentage of total luminous flux in a range of 3 to 7%,
the true-green LEDs have a percentage of total luminous flux in a range of 56 to 70%,
the red-orange LEDs have a percentage of total luminous flux in a range of 19 to 26%, and
the light engine has a CCT of 10000K.

14. The lighting fixture of claim 1, wherein the light engine further comprises a control circuit configured to control a brightness of the LED array.

15. The lighting fixture of claim 14, wherein the control circuit is further configured to maintain the brightness over small variations in electrical and thermal conditions during operation.

16. The lighting fixture of claim 14, further comprising a remote control configured to communicate with the control circuit to wirelessly adjust the brightness of the LED array based on input from a user.

17. The lighting fixture of claim 14, further comprising a control button, which is mounted to the housing, electrically coupled to the control circuit, and configured to adjust the brightness of the LED array based on input from a user.

18. The lighting fixture of claim 1, wherein the lighting fixture is an aquarium lighting fixture.

19. The lighting fixture of claim 1, further comprising a translucent cover mounted on the housing such that the LED array is located between the housing and the translucent cover.

20. The lighting fixture of claim 1, further comprising a reflector mounted within the housing.

21. An aquarium, comprising:
a tank having an open top defined by a top edge; and
a lighting fixture, which is mounted above or on a top edge of the tank, comprising:
a housing; and
a light engine, which is mounted to the housing, and has an LED array comprising:
deep-blue LEDs having a perceived wavelength within a range of 450 to 465 nm, and a percentage of total luminous flux in a range of 1 to 7%;
true-green LEDs having a perceived wavelength within a range of 523 to 527 nm, and a percentage of total luminous flux in a range of 53 to 70%;
red-orange LEDs having a perceived wavelength within a range of 610 to 620 nm, and a percentage of total luminous flux in a range of 19 to 32%; and
phosphor-based coolwhite LEDs having a percentage of total luminous flux in a range of 5 to 15%,
wherein the light engine has a correlated color temperature (CCT) in a range of 4500 to 10000K.

22. The aquarium of claim 21, wherein the light engine has a CCT of 6500K.

23. The aquarium of claim 21, the light engine further comprising a control circuit configured to control a brightness of the LED array.

24. The aquarium of claim 23, further comprising a remote control configured to communicate with the control circuit to wirelessly adjust the brightness of the LED array based on input from a user.

25. The aquarium of claim 23, further comprising a control button, which is mounted to the housing, electrically coupled to the control circuit, and configured to adjust the brightness of the LED array based on input from a user.

26. The aquarium of claim 21, wherein the lighting fixture further comprises a reflector mounted within the housing, and is configured to direct light from the LED array within the tank.

27. The aquarium of claim 21, wherein the lighting fixture further comprises a translucent cover mounted on the housing such that the LED array is located between the housing and the translucent cover.

28. The aquarium of claim 21, wherein the tank comprises freshwater.

29. The aquarium of claim 21, wherein the tank comprises saltwater.

30. The aquarium of claim 21, wherein the tank comprises aquatic plants and/or living things.

* * * * *